Sept 10, 1957 J. F. MILLER 2,806,125
WELDING GUN
Filed Oct. 29, 1954 5 Sheets-Sheet 1

WITNESSES
Robert C. Baird
Leon M. Garman

INVENTOR
Joseph F. Miller.
BY
ATTORNEY

Sept 10, 1957  J. F. MILLER  2,806,125
WELDING GUN
Filed Oct. 29, 1954  5 Sheets-Sheet 5

2,806,125
WELDING GUN

Joseph F. Miller, East Amherst, N. Y., assignor to Westinghouse Electric Corporation, East Pittsburgh, Pa., a corporation of Pennsylvania Application October 29, 1954, Serial No. 465,508

11 Claims. (Cl. 219—130)

My invention relates to an arc welding gun, and has particular relation to such a gun for welding with a consumable electrode in a shielding gas.

A welding gun of this type is analogous in form to an ordinary pistol including a barrel and a stock or housing. The barrel terminates in a nozzle and includes channels for transmitting cooling fluid usually water to and away from the nozzle and a channel for transmitting the shielding gas, which usually is an inert gas but may be another gas such as carbon dioxide, through the nozzle. The barrel also includes a guiding means, usually a guide tube, for guiding the welding electrode through the nozzle. The stock or housing is an enclosure which serves to hold the barrel and supports the means which conveys the cooling fluid to and away from the barrel and the shielding gas to the barrel. The housing serves as the handle for the operator and includes a switching mechanism similar in form to a trigger for turning the welding current on and off.

Welding guns in accordance with the teachings of the prior art are of relatively complex structure and the disassembly and repair of such a gun is a difficult and time-consuming process. It is broadly an object of my invention to provide a welding gun of simple and low cost structure which shall lend itself readily to disassembly and repairs.

I have discovered that an important disadvantage of the prior art welding guns arises from the construction and mounting of the electrode guide tube. This guide tube is made of copper of other highly heat conducting material and is screwed into a thread in the barrel. I have found that when the gun is in use the guide tube is frequently burned by the arc and must be replaced. In addition, the heat from the arc conducted by the guide tube to its securing mechanism tends to overheat and damage this mechanism. The replacement of the tube when its tip is burned is time-consuming delaying the welding operation materially, and where the securing mechanism for the guide tube is damaged disassembly and major repair of the gun is required.

It is accordingly a specific object of my invention to provide a welding gun having a guide tube mechanism which permits ready replacement of the guiding tube.

Another specific object of my invention is to provide a welding gun in which the guiding tube shall be so mounted that it and its mounting mechanism are effectively cooled.

A further specific object of my invention is to provide a securing mechanism of simple, readily replaceable, structure for the guide tube.

In guns constructed in accordance with the teachings of the prior art, the conductors for the cooling fluid and the shielding gas at least in part extend outside of the panel and the housing or stock of the gun. I have found such guns cumbersome and difficult to handle because the external portions of the tubes presented an obstacle to the manipulation of the guns. I have also found that in such guns the housing tends to become so hot that difficulty is encountered in handling it.

It is then a further specific object of my invention to provide a welding gun in which the fluid and gas tubes shall be so disposed as to offer no obstacle to the manipulation of the gun.

It is a further specific object of my invention to provide a gun in which the cooling shall be so effective that the operator shall be capable of handling the housing of the gun without any discomfort.

In welding with a gun of the general type involved here it is necessary that the rate at which the electrode is supplied, or the electrode speed, be precisely controlled during a welding operation. The rate of supply of the electrode determines the spacing between the electrode and the work and also the welding current. Precise control is important in most situations but is particularly important where the welding is from a constant potential source as disclosed in application Serial No. 429,932, filed May 14, 1954, to Harry J. Bichsel and assigned to Westinghouse Electric Corp.

In prior art guns there is difficulty in controlling the electrode speed. This difficulty arises principally from the fact that the control for the electrode drive is mounted on a panel to which the operator must turn to change the current when such change becomes necessary. Since one cannot weld and adjust the drive from an adjacent panel at the same time, the adjustment must necessarily be effected on a cut and try basis and cannot be carried out with the precision that may be required in many situations.

A further specific object of my invention then is to provide a welding gun which shall include facilities for readily adjusting the welding current while carrying out a welding operation.

In accordance with my invention, I provide a welding gun including a stock or housing of generally T-shaped form. The barrel is secured to the cross members and the handle corresponding to the stem of the T extends at an oblique angle to the barrel and its enclosure in the same manner as the handle extends from a revolver or an automatic pistol. Both the handle and the barrel supporting enclosures on the housing are hollow. The tubes for transmitting the cooling fluid and the shielding gas are mounted in ways in the handle passing through the handle and extending into the barrel supporting enclosure where they communicate with the channels in the barrel. The tubes terminate in fittings extending from the butt of the handle. The transmitting tubes are thus entirely within the housing. I have found that because of this construction the gun may be manipulated with facility when used and, in addition, the handle is cooled by the fluid passing through the cooling tubes within the handle, and the handle may be held by the operator even during a long welding operation without discomfort.

Actuating and inching switch mechanisms are also mounted in the handle. To operate these mechanisms triggers are provided on the side of the handle which is gripped by the hand of the operator.

To adjust the electrode speed while welding, the gun includes a variable resistor and a knurled knob or disk for actuating the resistor. The resistor and its disk are mounted coaxially in the space in the barrel supporting enclosure where it joins the handle, and the disk may be moved with facility by the operator while he is welding.

The consumable welding electrode is transmitted through a flexible guide which extends into the gun through the free end of the barrel enclosure and communicates with the barrel. The electrode passes through the guide and through a guide tube in the barrel. This guide tube is readily removable. It is held by a receptacle including a holding block and an externally accessible set screw which may be readily loosened when the guide is to be removed. The block in which the guide is held includes a portion of a channel through which the cooling fluid is transmitted and thus is cooled so that it does not tend to become excessively hot by reason of the heat conduction from the arc through the guide tube.

The novel features that I consider characteristic of my invention are disclosed generally above. The invention itself, both as to its organization and its method of operation, together with additional objects and advantages thereof, will be better understood when read in connection with the accompanying drawings, in which:

Fig. 11 is a diagrammatic view showing a welding system including a gun in accordance with my invention.

Figure 3:
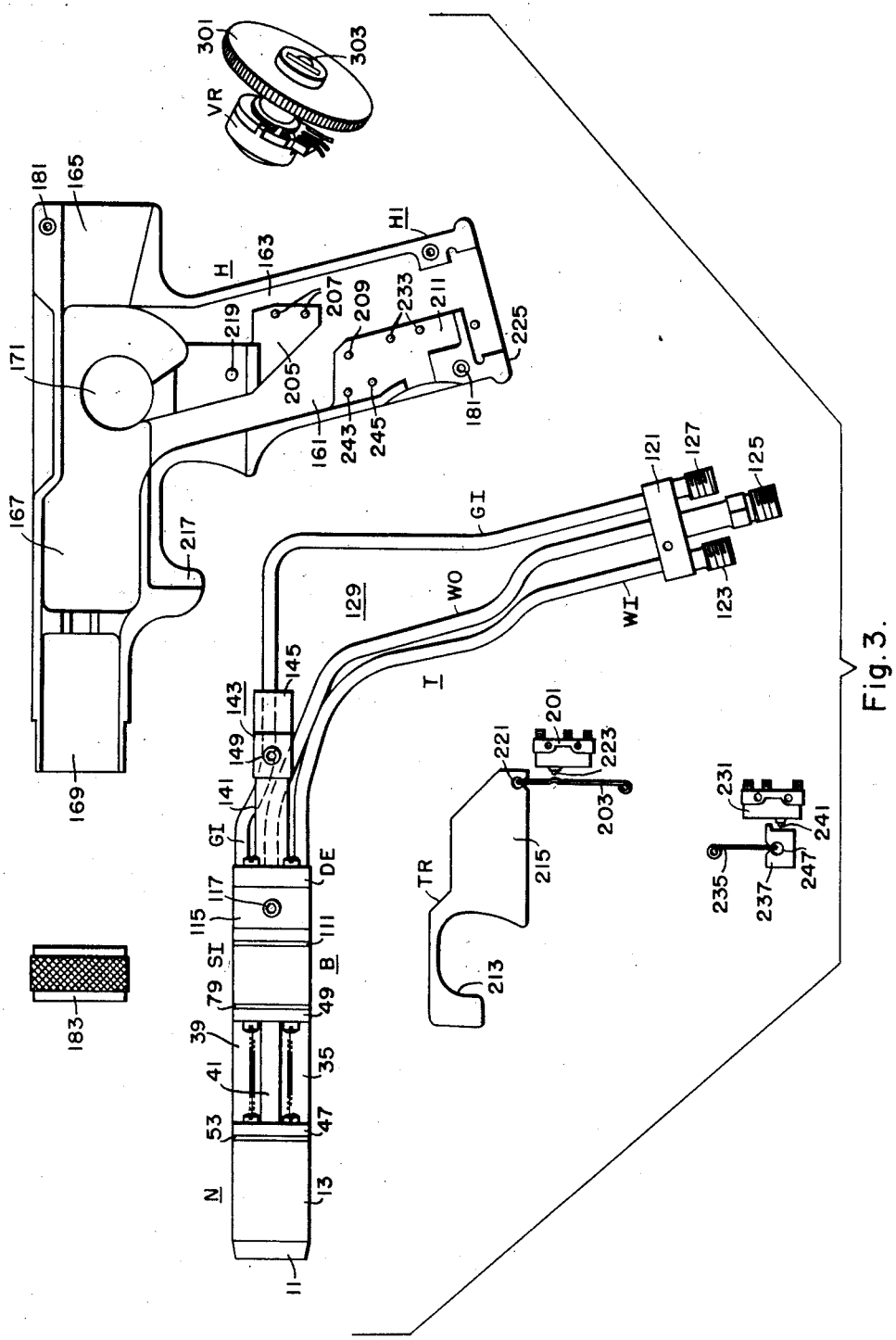
Fig. 3 is an exploded view showing the housing, the barrel and tube assembly and other components of the gun.

The gun shown in the drawings includes a barrel B, a housing H and a tube assembly T (Fig. 3). These components are combined into a compact unitary structure resembling a gun.

The barrel B includes a nozzle assembly N made up of an internally and externally tapered tip 11 which is secured to a nozzle body 13. The internal taper 34 (Figs. 5 and 6) of the tip 11 flares outward. This flare is of importance as it minimizes the probability of short-circuit between the electrode Z and its guide tube GE and the nozzle 11. The flare is such that it does not cause turbulence in the gas flowing through the nozzle. The body 13 (Figs. 5 and 6) is in the form of a cylinder having a wall which is hollow at 15 over a substantial portion of the length of the cylinder, and the internal surface 16 of which is tapered. The hollow portion 15 terminates in an annular opening 17 at one end and in a stem 19 at the other end. The stem 19 has a pair of openings 21 and 23 communicating with the hollow portion 15. These openings are preferably displaced by about 90° with reference to the axis of the body 13. The body is internally tapered. The tip 11 includes an attenuated annular portion 31 extending from the tapered portion. This annular portion is dimensioned to be secured in the opening 17 extending from the hollow portion of the body 13 with the edges of the opening engaging shoulders 33 in the tip. The tapered surfaces 16 and 34 of the tip 11 and body 13 are coextensive so that a smooth surface to the flow of gas is presented. The nozzle tip 11 and body 13 are both composed of Cupaloy alloy #7550-6.

Figure 1:
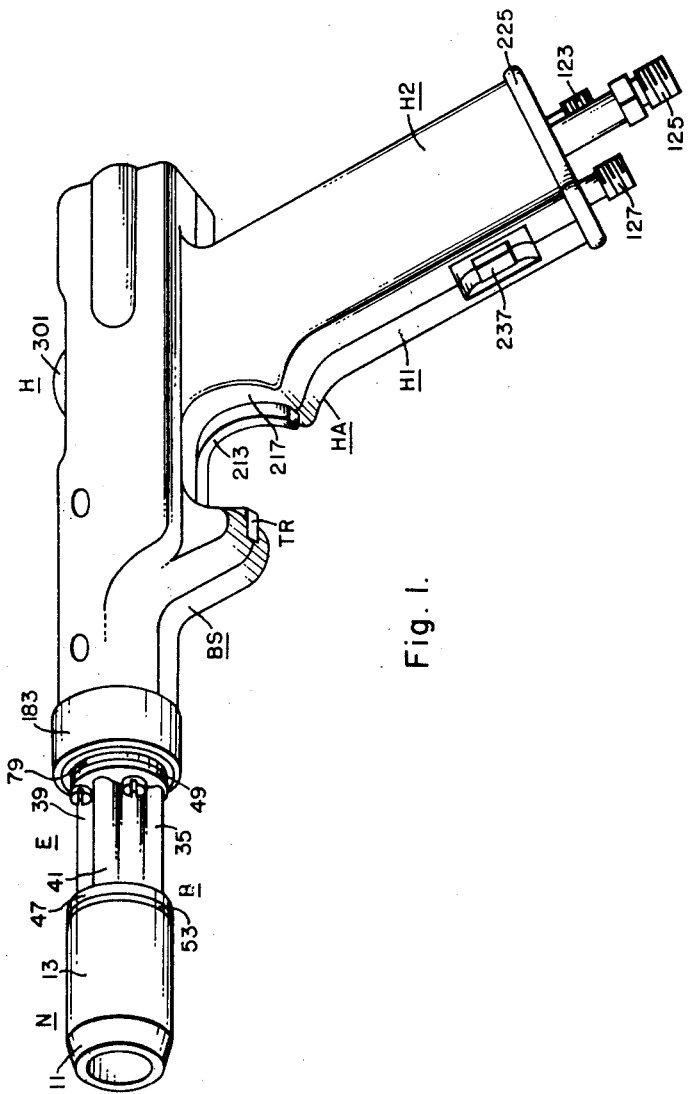
Figure 1 is a view in perspective of a gun in accordance with my invention.
Figure 2:
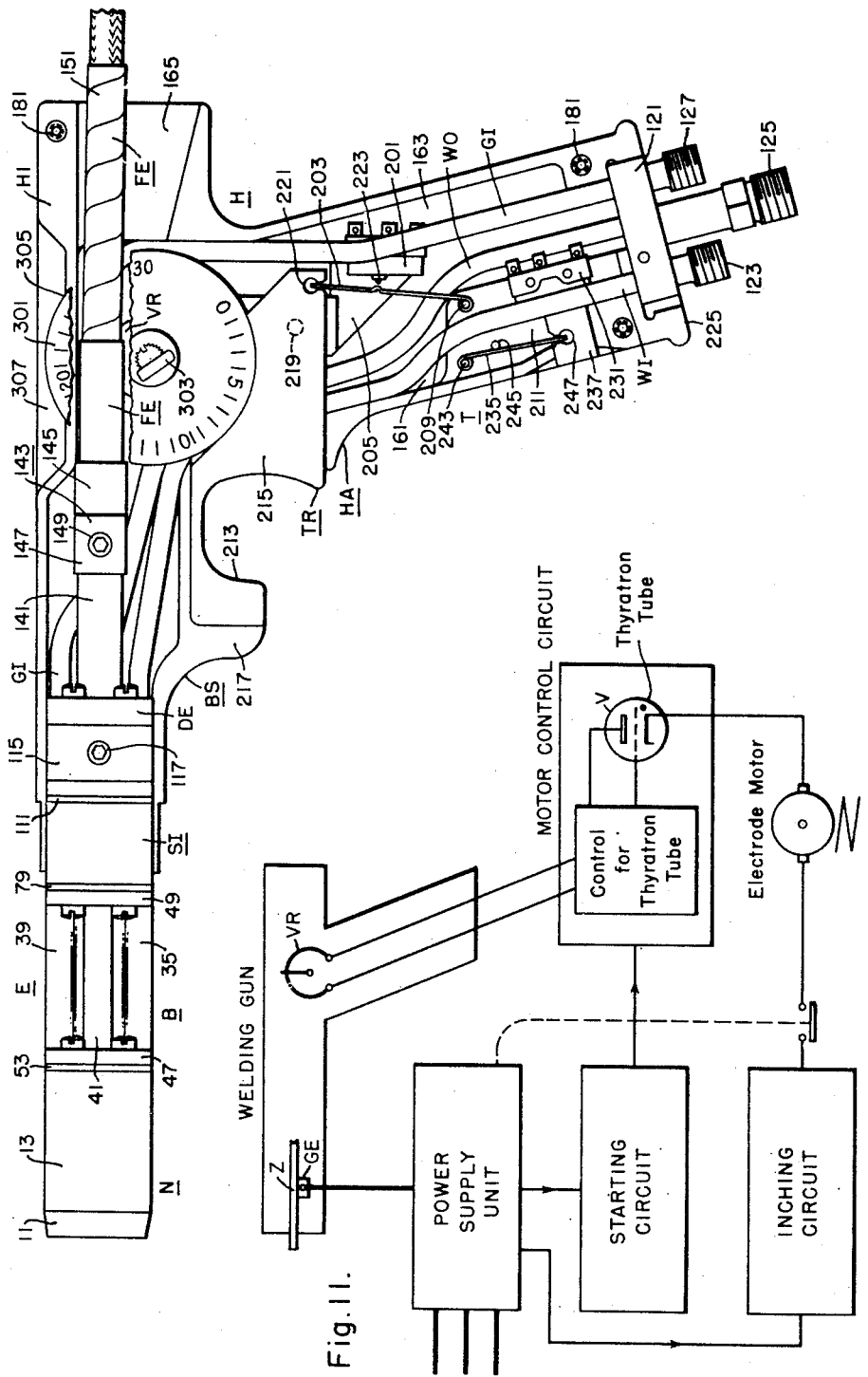
Fig. 2 is a view in side elevation with one of the halves of the stock or housing removed showing this gun.
Figures 4, 10:
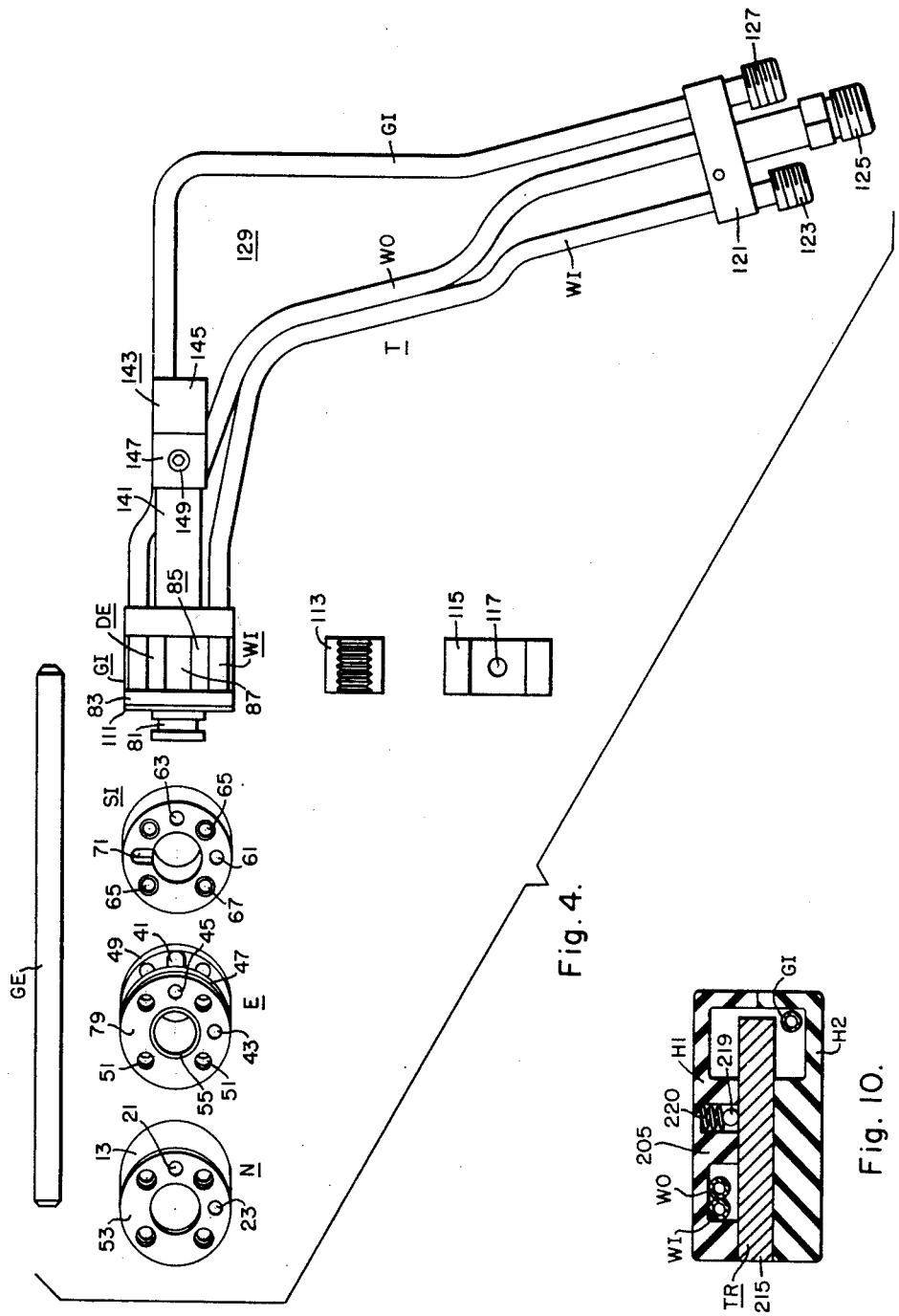
Fig. 4 is an exploded view showing the various parts of the barrel and of the tube assembly of a gun in accordance with my invention.
Fig. 10 is a view in section through the trigger and its retent.
Figure 5:
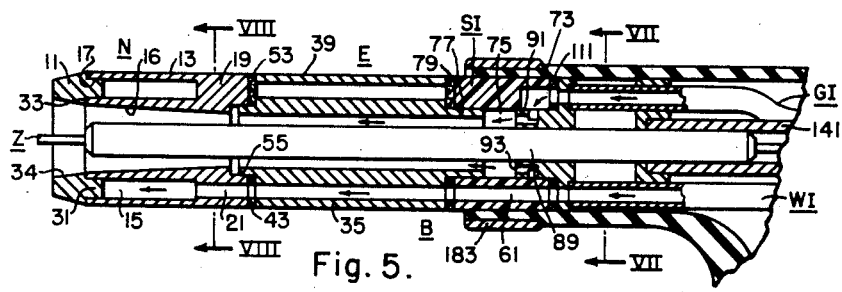
Fig. 5 is a view in longitudinal section of the barrel portion of the gun taken along line V—V of Fig. 7.
Figure 6:
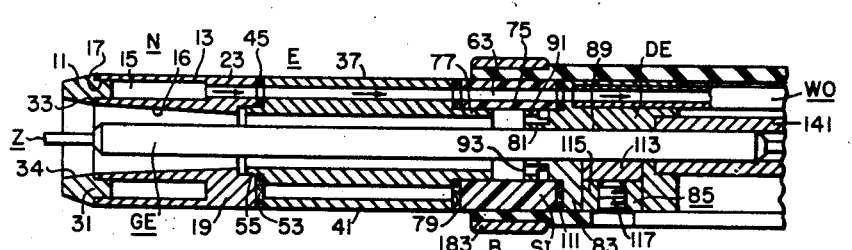
Fig. 6 is a view in longitudinal section taken along line VI—VI of Fig. 7.

The barrel also includes an extension E which is a flanged cylinder, between the external walls of which a plurality of hollow longitudinal tubular projections 35, 37, 39 and 41 extend (Figs. 5 and 6). For symmetry purposes, four of these projections spaced at 90° with reference to the axis of the extension E may be provided, but only two of these projections 35 and 37 are necessary. These projections 35 and 37 are spaced circumferentially to correspond to the spacing between the openings 21 and 23 in the nozzle body 13 and communicate with corresponding openings 43 and 45 in the flanges 47 and 49 (Fig. 1). In addition, the flanges 47 and 49 are provided with openings 51 (Fig. 4) which are between these two communicating openings 43 and 45 and through which the extension E is bolted in as a part of the barrel B. The extension E is secured to the nozzle body 13 in such manner that the open tubular projections 35 and 37 communicate with the openings 21 and 23 in the nozzle body (Figs. 5 and 6). An annular gasket 53 of a material such as asbestos is interposed between the nozzle body 13 and the extension E to prevent leakage of the cooling fluid. To facilitate the securing of the extension E to the nozzle body 13, the body and the extension, the extension E has a short stem 55 which extends into the body 13.

The barrel further includes an insulating spacer SI (Figs. 5 and 6) preferably composed of nylon. This spacer has a pair of longitudinal openings 61 and 63 circumferentially disposed to correspond to the openings 21 and 23 and 43 and 45 in the nozzle body 13 and in the extension E, and, in addition, a plurality of openings 65 for mounting which are provided with threaded inserts 67. In one of its faces, the spacer SI also has a groove 71 (Fig. 4) which communicates with the hollow channel 73 through its center. The spacer SI is bolted to the extension E at one of its faces in a position such that the longitudinal openings 61 and 63 therein communicate with the corresponding openings 43 and 45 and 21 and 23 in the extension E and in the nozzle body 13 and the face including the groove 71 is away from the extension E. The insulating spacer SI engages the extension E in a stem 77 and is separated from it by a gasket 79 of asbestos for preventing leakage of the cooling fluid and the gas.

Figure 7:
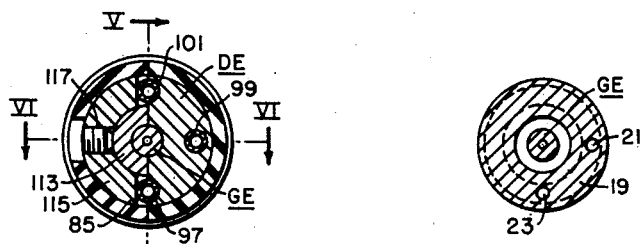
Fig. 7 is a view in transverse section taken along line VII—VII of Fig. 5.
Figure 8:
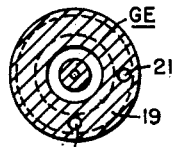
Fig. 8 is a view in transverse section taken along line VIII—VIII of Fig. 5.
Figure 9:
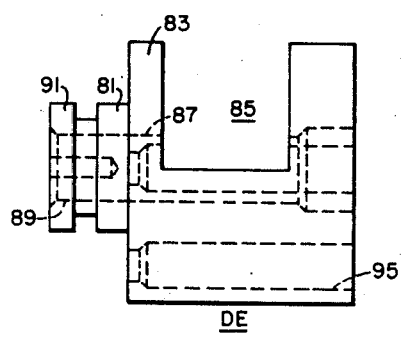
Fig. 9 is a view in elevation of a portion of the guide tube securing mechanism.

The barrel also includes a header DE (Fig. 9) which is composed preferably of Cupaloy alloy #7550-6. This header DE is of generally cylindrical form with a flanged stem 81 extending centrally from one of its bases 83. The cylindrical wall has on one side a transverse opening or groove 85 extending circumferentially over an angle of about 180°. This opening communicates with the opening in the central channel 87 of the cylinder which is coextensive with a corresponding opening 89 in the stem. The shoulder 91 of the stem remote from the base 83 of the cylinder has a plurality of longitudinal openings 93 (Figs. 5 and 6). The cylinder has a plurality of openings 95 for securing bolts and, in addition, has three openings 97, 99 and 101, two of which, 97 and 99, correspond to the openings 61 and 63 in the insulating spacer SI and the third 101 (Fig. 7) to the groove 71 in the insulating spacer SI in circumferential position. The opening 101 corresponding to the groove 71 in the insulating spacer SI is thus displaced by 90° from one of the other openings and by 180° from the other. The header DE is secured to the insulating spacer by bolts extending through the bolt openings 95 (Fig. 9) in the header and screwed into inserts in the insulating spacer SI. The stem 81 in the header DE engages the opening 75 in the insulating spacer SI firmly and a gasket 111 is interposed between the base 83 of the header DE and the insulating spacer SI. When the header DE is secured to the insulating spacer SI, two of the openings 97 and 99 in the header cylinder communicate with openings 61 and 63 in the insulating spacer and the third 101 communicates with the groove 71 in the insulating spacer.

The barrel further includes an electrode guide tube GE which passes through the central opening 89 and 87 in the stem 81 and cylinder of the header DE (Figs. 5 and 6). This guide tube GE may be secured in the header by a threaded clamp jaw 113 (Fig. 7) which is held securely between the guide tube GE and a jaw housing 115. The jaw housing 115 is secured to the clamp jaw 113 by a set screw 117. The set screw 117 is accessible so that an operator may readily loosen it and remove the guide tube GE if it becomes damaged. The clamp jaw 113 and jaw housing 115 may be composed of stainless steel, preferably #6478–1.

The tube assembly (Fig. 3) includes a plurality of tubes, WI, the water inlet, WO, the water outlet, and GI, the gas inlet, composed of copper, the ends of which extend through a block 121, also of copper. The tubes WI, WO and GI may be silver soldered to the block 121. The ends of the tubes WI, WO and GI which extend through the block 121 are provided with fittings 123, 125 and 127, respectively. One of the tubes GI is bent in a sharp right angle and the others, WI and WO, are bent in more oblique angles. There is thus a space 129 of substantial dimensions between the one tube GI and the other. The fitting 125 on the tube WO is larger than the others and this tube serves to transmit the power to the welding electrode Z.

The tubes WI, WO and GI pass through the openings 97, 99 and 101, respectively, in the header DE and are secured to the header by silver soldering (Figs. 2 through 8). The gas tube GI passes through the opening 101 which communicates with the groove 71 in the insulating spacer SI. The water-inlet tube WI passes through the opening 97 which communicates with one longitudinal opening 61 in the spacer and the water-outlet tube WO communicates with the other longitudinal opening 63 in the spacer. The tubes WI and WO are thus in communication with the hollow space 15 within the nozzle body 13 and convey cooling fluid, preferably water, to the hollow space. The flow of the water is represented by heavy lined arrows in Figs. 5 and 6. The water outlet tube WO also conducts current through the header DE to the guide tube GE and through it to the welding electrode Z. The tube GI is in communication with the nozzle opening and conveys gas to the opening. The lighter arrows represent the flow of gas.

A flexible conduit assembly FE (Fig. 2) for transmitting the welding electrode Z is secured to the central opening 87 in the header DE. This assembly includes a tube 141 of copper or other suitable material from which a receptacle block 143 extends. This block 143 is of generally step form including a central section 145 through which there is an opening communicating with the tube 141 and with the header and a projecting portion 147 through which a set screw 149 is secured to hold the tube 141. When the gun is used, a flexible conduit 151 which does not concern the present invention and is not shown in detail, is inserted into the receptacle block and held by the set screw 149. The welding electrode Z extends through the flexible tube 151 into the guide tube GE and through it to the tip of the nozzle N.

The housing H is made up of a pair of congruent sections H1 and H2, (Figs. 1 and 3) preferably composed of a phenolic condensation product. Each of the pieces is provided with ways 161, 163, 165, 167, a groove 169 and a circular cavity 171 so that when they are disposed face to face with the congruent surfaces engaging, the housing has spaces for the various components of the gun. For securing the sections H1 and H2 together, holes (not shown) are provided in one of the sections H2 and suitable threaded inserts 181 in the other H1. When the sections H1 and H2 are assembled into housing H the housing includes a barrel supporting enclosure BS from which a handle HA extends at an oblique angle to the barrel B.

The barrel supporting enclosure BS includes at one end a tubular tip formed by the grooves 169 (Fig. 3) which engages the insulating spacer SI and the header DE and its associated components. The tip (169) is urged into firm engagement with the spacer SI by a knurled ring 183 which is dimensioned to fit the tip (169) tightly. From this space a deep cavity formed by the ways 167 and it, in turn, communicates with an open slot-like opening formed by the way 165. The handle HA is integral with the tube enclosure BS and includes cavities formed by the ways 161 and 163 which communicate with the cavity in the barrel enclosure.

The gun includes a starting switching mechanism and an inching switching mechanism. The starting mechanism consists of a microswitch 201 and a leaf spring 203 (Fig. 3) for actuating the switch. The microswitch 201 is mounted on a boss 205 of section H1 surrounding ways 161 and 163 and is properly positioned by positioning pins 207. The leaf spring 203 is mounted on a pin 209 extending from another boss 211 of the section H1. The leaf spring 203 is actuable by a trigger TR, which is in the form of a plate having a groove 213 on one side, adapted to be engaged by the index finger of the operator's hand and an extension 215. This plate TR is positioned in a groove of generally arcuate contour formed between extensions 217 from the sides of the oblique angle between the handle HA and the enclosure BS with the extension 215 extending into a slot in the handle HA. The plate TR has two positions in each of which it is held by a detent ball 219 which is set in a hole in the boundary of the groove in section H1 and is urged outward by a spring 220 (Fig. 10). In its outermost position the plate TR is held by the frictional force asserted by the ball 219 (Fig. 2) and in the other, innermost position, the plate is also held by the frictional force exerted by the ball 219. The trigger TR is normally set in the outermost position in which spring 203 is disengaged from the button 223 of the microswitch 201. The extension 215 of the plate TR has at its tip a small flared slot communicating with a circular opening 221 in which the free end of the leaf spring 203 is held. The trigger TR may be moved with the index finger from the outermost to the innermost position and this movement causes the leaf spring 203 to move into engagement with the button 223 on the microswitch 201 to actuate the latter. In this latter position the trigger TR is held by he detent 219. The microswitch 201 may be connected by suitable conductors (not shown) which pass through the butt 225 of the handle HA to the welding apparatus. The connection to the apparatus is shown schematically in Fig. 11 and is fully disclosed in a copending application, Serial No. 465,600, to Harry T. Bichsel and Alfred J. Balslack filed concurrently herewith and assigned to Westinghouse Electric Corporation hereinafter called Bichsel application which is incorporated herein by reference.

The inching switch also includes a microswitch 231 which is positioned by means of positioning pins 233 on the boss 211 defining the junction of ways 161 and 163. This microswitch 231 is actuable by a leaf spring 235 through a button 237 (Fig. 2) in the form of a block. The button 237 is held in disengagement from the button 241 of the microswitch 231 by the leaf spring 235 which is secured to one pin 243 and held in tension by another pin 245 over which it passes. The leaf spring 235 engages the button 237 through a flared opening which communicates with a circular opening 247. The microswitch 231 may be actuated by pressing the button 237 with the small finger of the hand gripping the handle HA thus counteracting the force of the leaf spring 235 and pressing the button 241. The microswitch 231 is connected by conductors passing out through 225 as shown in the Bichsel application.

The tubes WI, WO, GI are disposed in slots in the handle HA formed by ways 161 and 163 and extend through the junction between the handle and the enclosure BS into cavities formed between the ways 167 into the barrel B. The tubes WO and WI are shown extending between the section H2 and the microswitch 231 and between the trigger plate TR and section H2. Tube GI extends between microswitch 201 and the edge of plate TR and the section H2. When the tubes are disposed in the slots in the handle HA, the block 121 to which the tubes are secured is disposed in a slot in the butt 225 of the handle. The fittings 123, 125, 127 on the tubes thus extend through the butt 225.

The electrode speed may be varied by actuating a variable resistor VR in circular cavity 171 of the barrel enclosure. The resistor VR is disposed in the space 129 between the tube GI and the tubes WI and WO. The variable resistor VR is connected by means of a conductor which passes through the handle HA to the control circuit of the motor which controls the speed at which the electrode is transmitted through the apparatus during a welding operation. The connection of the variable resistor VR to the motor is shown in the Bichsel application. The variable resistor VR may be a type QH–122–35,000 ohm potentiometer.

An actuating disk 301 having a knurled edge is secured to the adjusting pin 303 of the resistor VR. The disk 301 extends over the tube GI and over the edge of the extension 215 of the trigger TR. The flexible cable 151 passes between the disc 301 and the variable resistor VR. The barrel housing BS is provided with a slot 305 into which the disk 301 for adjusting the variable resistor VR extends. The disk 301 is protected by the portion 307 of the housing enclosing this slot 305 and still may be operated by the hand of the operator holding the gun.

The gun is used in apparatus as shown in Fig. 11 which presents schematically the system shown in the Bichsel application. The gun labeled in Fig. 11 Welding Gun is connected to a Power Supply Unit from which the power for welding is desired. The switches 201 and 231 are connected to a Starting Circuit, and an Inching Circuit respectively by means of which the operation is started and the electrode Z may be set. The resistor VR is connected to the Motor Control Circuit for the Electrode Motor which drives the electrode Z. This Motor Control Circuit includes an electric discharge valve V which is preferably a thyratron and has a control circuit. The resistance VR is connected in this control circuit.

The Power Supply Unit of this apparatus is described in the Bichsel application as being of the constant-potential type disclosed in the above-mentioned application Serial No. 429,932. When the Power Supply Unit is of the constant-potential type small changes in the speed of the electrode causing the tip of the electrode from which the arc extends to approach or recede from the work produce large changes in the welding current. The small resistance VR on the gun thus can control the welding current and the deposit of weld metal over a wide range and thus effectively control the quality of the weld.

In the use of the apparatus a guide tube GE is secured in the header DE and the flexible guide 151 for the electrode is secured to the receptacle block 143. The electrode Z is then driven through the flexible tube 151, through the tube 141 secured to the header DE and through the guide tube GE until it projects from the end of the nozzle opening. During a welding operation, cooling fluid is transmitted through the inlet and outlet fluid tubes WI and WO and the hot terminal of the power supply is connected to the fitting 125 extending from the outlet fluid tube WO. Power is supplied and a welding operation is carried out as disclosed in the Bichsel application. Briefly, the welding electrode Z is set by actuating the inching switch 231, then the electrode Z may be engaged with the work and the starting switch 201 may be actuated by closing the trigger TR. During the welding operation the speed of the electrode Z may be adjusted by properly positioning the variable resistor VR by means of the disk 301. The changing of the position of the electrode Z relative to the work changes the welding current.

It is seen that the gun is of simple and compact structure. The tubing WI, WO and GI for conveying the fluid and the gas is entirely within the housing. The guide tube GE is readily removable from the gun. Since the guide tube is metallically in contact with the header DE which conveys cooling fluid, the guide tube, the header and its securing mechanism are cool during operation. In addition, since the cooling fluid is transmitted through the hollow space in the nozzle body, the nozzle is also maintained cool. The speed at which the electrode is transmitted through the nozzle and, therefore, the welding current, is controlled by the variable resistor and the operator may thus set this speed while the welding operation is being carried out. The gun may be readily disassembled for cleaning or repair. The housing is opened by removing several screws. Since the springs 203 and 235 are leaf springs, they and the parts near them are not ejected when the housing sections H1 and H2 are separated. The barrel B may be disassembled by removing several bolts. My experience with the gun has demonstrated that it operates highly satisfactorily.

While I have shown and described a certain specific embodiment of my invention, many modifications thereof are possible. My invention, therefore, is not to be restricted except insofar as is necessitated by the prior art.

I claim as my invention:

1. An arc welding gun for welding with a consumable electrode having a barrel terminating in a gas nozzle, said barrel having means for guiding said electrode, so that it passes through said nozzle, fluid channels for transmitting a cooling fluid to, and away from, said nozzle and a gas channel for transmitting a shielding gas through said nozzle; and said gun also including means for conveying said fluid to and away from said fluid channels and gas to said gas channel and a housing enclosing said barrel and said conveying means; the said fluid and gas channels being wholly within said barrel and said conveying means being wholly within said housing.

2. A gun according to claim 1 characterized by a generally T-shaped housing including a barrel supporting enclosure from one end of which a barrel extends and from which a handle extends at an oblique angle to the barrel and by the fact that the conveying means extends through the handle into the barrel supporting enclosure and within the barrel supporting enclosure communicates with the channels in the barrel.

3. An arc welding gun for welding with a consumable electrode having a barrel terminating in a gas nozzle, said barrel having a shell including fluid channels for transmitting a cooling fluid to, and away from, said nozzle, and a gas channel for transmitting a shielding gas through said nozzle and means within said shell for guiding an electrode through said barrel; the said gun also including means for conveying fluid to and away from said fluid channels and gas to said gas channel and a housing enclosing said barrel and said conveying means, the said gun being characterized by the fact that the guiding means is a tube held by a set screw or the like near the end of said barrel remote from the nozzle, said tube being removable through said nozzle on release of said set screw.

4. A gun according to claim 2 characterized by a switch mechanism which includes a microswitch within the handle and means for actuating said microswitch including a resiliently mounted trigger accessible for actuation by the fingers of an operator.

5. A gun according to claim 4 characterized by the fact that the resiliency of the mounting for the trigger is provided by a leaf spring.

6. A gun according to claim 1 characterized by a generally T-shaped housing including a barrel supporting enclosure from one end of which a barrel extends and from which a handle extends at an oblique angle to the barrel and by the fact that the conveying means are tubes extending through the handle into the barrel supporting enclosure and within the barrel supporting enclosure communicating with the channels in the barrel, one of said conveying tubes being separated from the others in said barrel supporting enclosure, and further by a variable resistor for varying the speed at which the electrode passes through the gun and means for varying said resistor, said resistor and said varying means being mounted within said barrel supporting enclosure between said one conveying tube and said other conveying tubes.

7. An arc welding gun for welding with a consumable electrode in a gaseous shield including a barrel terminating in a gas nozzle, said barrel having means for guiding said electrode therethrough so that it passes through said nozzle and is consumed during a welding operation, an inlet fluid channel for transmitting a cooling fluid to the nozzle, an outlet fluid channel for transmitting said fluid away from said nozzle, and a gas channel for transmitting shielding gas to said nozzle; said gun also including inlet and outlet fluid tubes and gas tubes, respectively, for conveying fluid to said inlet channel and away from said outlet channel and for conveying said gas to said gas channel and a housing of generally T-shaped form including a barrel supporting enclosure having the barrel mounted at one end thereof from which a handle extends at an oblique angle to the barrel; the said gun being characterized by the fact that said tubes extend through said handle into said enclosure where they communicate with their respective channels in said barrel and said electrode passes through the cross member of said enclosure entering at the end remote from said barrel.

8. A gun according to claim 7 characterized by the fact that the barrel includes a shell having the channels therein and the guiding means is a tube within said shell secured to the barrel near the end thereof remote from the nozzle by means including an externally accessible set screw, said tube being removable through the nozzle on release of the set screw.

9. An arc welding gun for welding with a consumable electrode having a barrel terminating in a gas nozzle, said barrel having means for guiding said electrode, so that it passes through said nozzle, fluid channels for transmitting a cooling fluid to, and away from, said nozzle and a gas channel for transmitting a shielding gas through said nozzle; and said gun also including means for conveying said fluid to and away from said fluid channels and gas to said gas channel and a housing enclosing said barrel and said conveying means.

10. Apparatus for arc welding work with a consumable electrode including power supply means of the constant-potential type, a welding gun, a motor for driving said electrode through said gun, means connected to said gun and said power-supply means for connecting said power-supply means between said electrode and said work as said electrode passes through said gun to produce an arc between said electrode and said work, a control circuit for said motor connected to said motor, said control circuit including a variable impedance for varying the speed of said motor mounted on said gun so that it may be varied by the holder of said gun, and electrical connections between said impedance and said control circuit, the said apparatus being characterized by a motor control circuit including at least one electric discharge valve having a principal circuit connected to supply current through said motor and a control circuit having said variable impedance connected therein to vary the current flow through said principal circuit.

11. An arc welding gun for welding with a consumable electrode in a gaseous shield including a barrel terminating in a gas nozzle, said barrel having means for guiding said electrode therethrough so that it passes through said nozzle and is consumed during a welding operation, an inlet fluid channel for transmitting a cooling fluid to the nozzle, an outlet fluid channel for transmitting said fluid away from said nozzle, and a gas channel for transmitting shielding gas to said nozzle; said gun also including inlet and outlet fluid tubes and gas tubes, respectively, for conveying fluid to said inlet channel and away from said outlet channel and for conveying said gas to said gas channel and a housing of generally T-shaped form including a barrel supporting enclosure having the barrel mounted at one end thereof from which a handle extends at an oblique angle to the barrel; said tubes extending through said handle into said enclosure where they communicate with their respective channels in said barrel and said electrode passing through the cross members of said enclosure entering at the end remote from said barrel, said barrel supporting enclosure having a cavity means communicating with the outside through a groove, said groove and cavity being adjacent the region of said gun where said barrel supporting enclosure joins said handle, a variable resistor within said cavity means, and varying means for said resistor mounted coaxially with said resistor within said cavity means and extending through said groove so that it is readily accessible for manipulation by the holder of said gun while he is holding the gun in welding position, said resistor being adapted to control the speed of said electrode.

References Cited in the file of this patent

UNITED STATES PATENTS

| | | |
|---|---|---|
| 1,508,711 | Noble | Sept. 16, 1924 |
| 2,282,522 | Kratz | May 12, 1942 |
| 2,428,849 | Kratz | Oct. 14, 1947 |
| 2,443,658 | Kratz | June 22, 1948 |
| 2,462,458 | Beymer | Feb. 22, 1949 |
| 2,504,868 | Muller | Apr. 18, 1950 |
| 2,510,205 | Baird | June 6, 1950 |
| 2,510,415 | Pitcher | June 6, 1950 |
| 2,558,083 | Green | June 26, 1951 |
| 2,572,084 | Wilson | Oct. 23, 1951 |
| 2,586,140 | Anderson | Feb. 19, 1952 |
| 2,628,302 | Tyrner | Feb. 10, 1953 |
| 2,658,132 | Welch | Nov. 3, 1953 |

FOREIGN PATENTS

| | | |
|---|---|---|
| 662,806 | Great Britain | Dec. 12, 1951 |
| 712,259 | Great Britain | July 21, 1954 |